April 24, 1945.  G. DAVENPORT  2,374,257

MOTOR CONTROL SYSTEM

Original Filed Sept. 12, 1941  3 Sheets-Sheet 1

INVENTOR
Granger Davenport
Albert F. Nathan
ATTORNEY

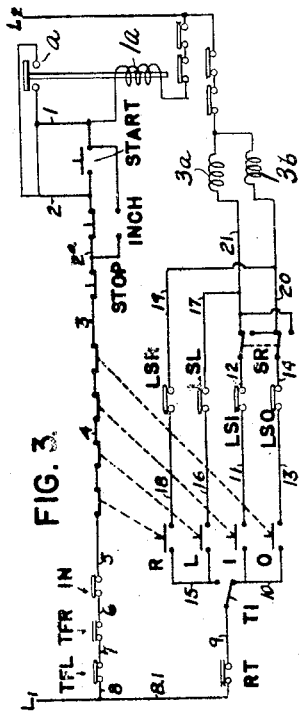

April 24, 1945.　　　G. DAVENPORT　　　2,374,257
MOTOR CONTROL SYSTEM
Original Filed Sept. 12, 1941　　3 Sheets-Sheet 3

INVENTOR
Granger Davenport
Albert F. Nathan
ATTORNEY

Patented Apr. 24, 1945

2,374,257

UNITED STATES PATENT OFFICE 2,374,257

MOTOR CONTROL SYSTEM

Granger Davenport, Montclair, N. J., assignor to Gould & Eberhardt, Incorporated, Irvington, N. J., a corporation of New Jersey Original application September 12, 1941, Serial No. 410,491. Divided and this application November 6, 1942, Serial No. 464,711

6 Claims. (Cl. 172—239)

The present invention relates to a system of motor controls and interlocks adapted more particularly for machine tool use, wherein one or more prime movers may be employed to propel various elements in transverse directions in sequential order and wherein it may be desirable that the motions of the driven element or elements be coordinated and related to perform, in a given cycle, an operation or series of operations on a workpiece.

The invention aims to render available a system of controls for controlling the operational characteristics of two motors, selectively operable to effect movement of the driven member or members at different rates selectively in opposite directions along transverse paths of their movement, and wherein operation of one of the motors automatically precludes operation of the other. In the example about to be referred to, the driving transmissions involved embody one or more mechanical clutches and reversers, and at least one of the drive motors is itself reversible, and the present invention aims to provide a control system whereby conflict between the several power drives and reversing means is avoided so that the operator is assured that the mechanisms will operate at the rate and in the direction, as expected and intended, whenever the control button or other control element associated with a particular operation, rate, or direction, is actuated.

In my prior application, Ser. No. 410,491, of which the present application is a division, a worm gear hobbing machine has been taken as representative of a type of machine in which the several motions of the tool and work require especial directional relations consistent with cutting right and left hand worm gears. Such a machine will also be referred to herein for the purpose of illustrating an environment wherein the present invention is well adapted. The present invention, it will be understood, is not restricted to machine tool applications, but is applicable to other uses in which transmissions are utilized in a functionally similar manner.

In the worm gear hobbing machine referred to, the work carrier and hob are power rotated and fed during a normal tooling operation, and the feed may be radially relative to the work axis, or tangentially relative to the work axis, or radially and tangentially, sequentially according to the plan of the gear cutting operation. In such a machine there is also an auxiliary power source, for effecting relative movement between the hob and the work in transverse planes and also in opposite directions in each of the transverse planes, which must not be used concurrently with the main drive, but when used must be directionally controlled in a manner compatible with a previously set condition in the main drive.

The present invention aims to render available a semi-automatic control for motors performing such functions which, in conjunction with certain mechanical elements of the driven transmission, is operative to prevent incompatible or inconsistent operation of two or more trains of mechanisms and power sources, correlates directional relations of one or more of the power sources with another or with relation to previously set mechanical elements of the machine, provides for repeated stopping of one or more drive trains at preset distances, guards against accidental abuse of the controls and, in cases where a reversible power source selectively drives a particular element or train which is also mechanically reversible, insures that the direction of operation of the power source will be in harmony with the required direction of movement of the driven element in accordance with a preset condition of the transmission.

In the machine of the type referred to, the main motor drives the cutter, the work, the main feed transmission, the infeed and tanfeed sub-transmissions, and the lead gearing, all in harmonious relation. Reversers and clutches are built into the various drive trains at selected points so that reversals of motion may be made in some trains, and directional relations maintained or restored in others, and still others disengaged. In the same machine an auxiliary source of power is provided to effect at least some of the operational movements at a relatively rapid rate for the purpose of expediting the setting up of new work and for expediting machine movements between tooling cycles.

Neither of the two sources of power should be operated while the other is operating, for obvious reasons, and this invention aims to provide a system of controls wherein each power source is controllable independently of the other, but wherein the control of each is interlocked with and mutually dependent upon the other.

The invention further undertakes to provide a double system of controls for a reversible motor which is operable to drive an independently reversible transmission in such manner that when that transmission has been preset to effect a given operation by another motor, one of the two systems of controls for the reversible motor becomes effective and the other system becomes ineffective, and conversely. And to embody in at least one of said two systems of control a supplementary relation-restoring device for oppositely converting the effective action of the control on the reversible motor in accordance with a particular condition of the transmission so that when the said one of the two parallel systems of controls is effective, the actual direction of motor operation is in harmony with that particular condition.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a typical embodiment of this invention have been annexed as a part of this disclosure and, in such drawings, like characters of reference denote corresponding parts throughout all the views, of which:

Fig. 2 is a wiring diagram of a preferred form of control system for two motors.

Fig. 3 is a schematic diagram thereof.

Figures 1, 5:
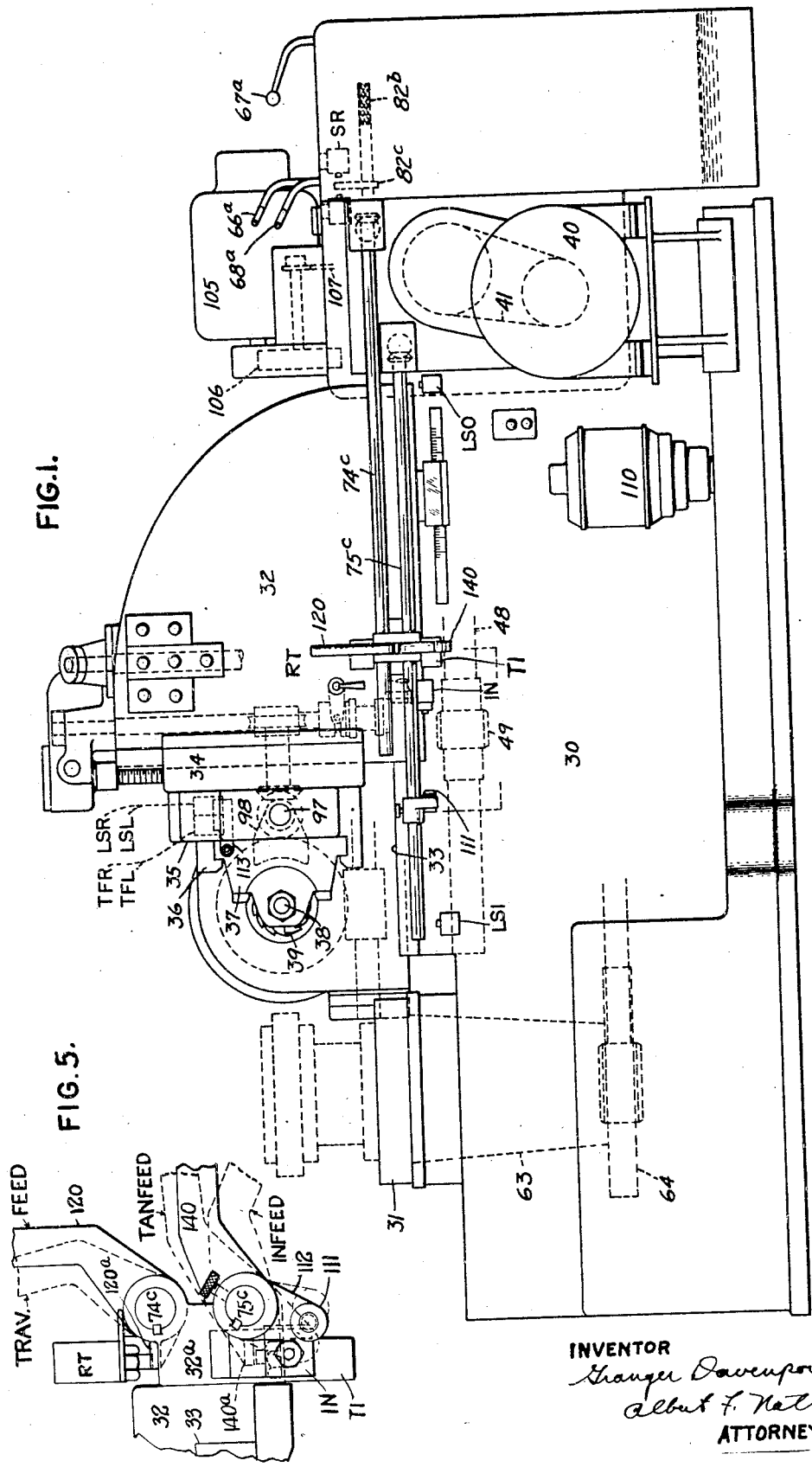
Figure 1 is a side view of a machine tool embodying this invention and illustrating the locations of certain interlocked controls.
Fig. 5 is an enlarged view of two of the control levers of the machine and their relation to portions of the motor control systems.

My aforementioned application sets forth in detail the structure and operation of the machine disclosed in the drawings. However, for convenience and to enable a better understanding of the invention to be attained a condensed description of the machine to which this invention is suited will also be given here.

Referring to Figure 1, the worm gear hobbing machine illustrated is provided with a base member 30 that supports a rotatable work table 31 and a reciprocable stanchion 32 mounted on the ways 33. The stanchion carries a vertically adjustable slide 34 to which a head 35 is pivoted, and the latter supports a laterally movable tool slide 37 which carries the hob spindle 38 and the hobbing tool 39. The various elements just mentioned are mounted and related so that the hob may be moved toward the left or toward the right, up and down, in and out, and angularly about the horizontal pivot, certain of these movements being useful in setting up the machine and others being used during the tooling operation.

Figure 4:
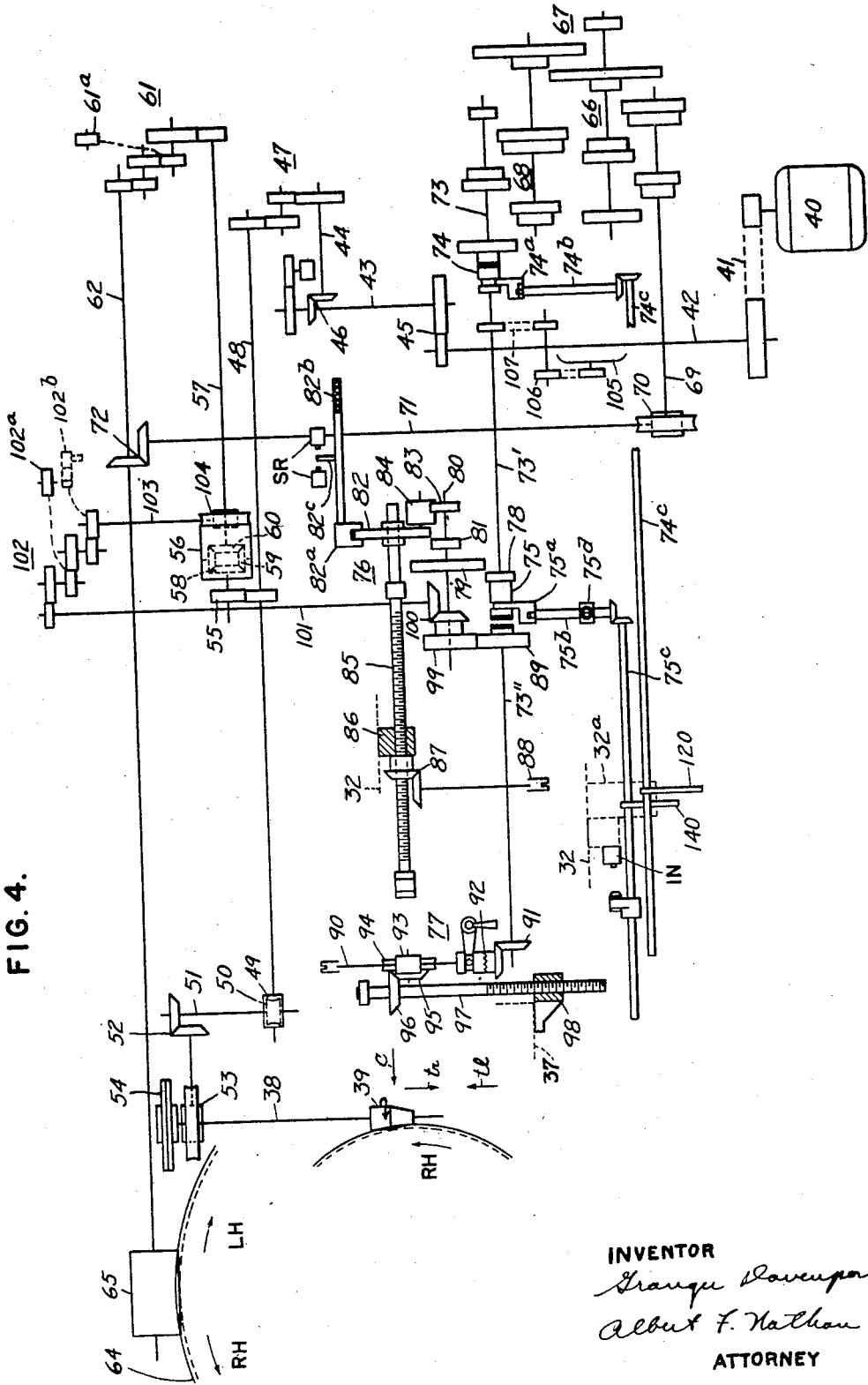
Fig. 4 is a line diagram of the main drive and rapid traverse transmissions and the interlocking controls.

The main drive for the machine begins at the motor 40 and enters the main drive shaft 42 through the belt or chain 41, see Fig. 4. Gears 45, shaft 43, gears 46 and shaft 44 transmit the power to a set of speed change gears 47 and thence to the cutter drive shaft 48. At the front end of the machine, worm gears 49, 50, shaft 51, gears 52, worm gears 53 and index plates 54 transmit the power to the hob spindle 38.

The work table drive is taken off the cutter drive train at a point beyond the speed change gears 47. Gears 55 are provided for this purpose which transmit power through differential gearing 56, 58, 59, 60, to the shaft 57 and index change speed and reversing means 61. A shaft 62 conveys power forward to the table driving worm and worm gear 65 and 64. To effect a reversal in the direction of table rotation an idler gear 61ª is adapted to be incorporated in the index gearing 61, but the insertion or removal of the idler does not, it will be seen, effect the direction of cutter rotation.

The cutter feed (tangentially and radially) is taken off the work index train by the bevel gears 72, connected beyond the change gears and reversing mechanism 61, and thus the direction of feed and rate is initially definitely related to the direction and rate of work rotation. A cross shaft 71 conveys feed power to the worm and worm wheel mechanism 70, thence through shaft 69 to three serially arranged sets of change gears 66, 67, and 68 to a main feed shaft 73. These change speed mechanisms provide 32 different feed rates. A main feed clutch 74, when engaged, transmits the feed power to a coaxial shaft 73′, and from this shaft 73′ the feed power may be directed to the cutter through either the infeed train of mechanisms 76 or a cutter tangential feed train of mechanisms 77, controlled by a selector clutch 75. The infeed train comprises gears 78, 79, shaft 80, gears 81, 82, and gears 83, 84 and 82. The final gear 82 is slidable on the feed screw shaft 85 and may be shifted to mesh with gear 81 or with the reversing gear 84. A nut 86 secured to the stanchion 32 cooperates with the feed shaft to effect cutter movement in or out by power. Manual means for shifting the stanchion is provided through bevel gears 87 and a hand crank shaft 88.

When the selector clutch 75 is shifted to engage with clutch gear 89 and shaft 73″ (the centripetal feed train is disconnected) and feed power is conveyed to the tangential feed screw 97 through bevel gears 91, reset clutch 92, worm and worm wheel 93, 94, and bevel gears 95 and 96. A traveling nut 98 secured to the cutter slide 37 coacts with the feed screw 97 to propel the cutter to the right or left, tangentially of the work. A hand crank may be applied to the end of the shaft 90 for manually imparting lateral movements to the cutter when desired.

It may be mentioned here that the gearing for the tangential feed of the hob of the present machine is initially constructed to impart a feed movement to the cutter or hob in a direction always opposed to the direction of roll of the work, that is, the tangential feed is always against the work rotation so that the advance of the cutter holds back rather than pulls the work along. As illustrated in Fig. 4, the above mentioned relation of tangential feed to work rotation, remains a fixed relation notwithstanding the fact that the machine may be set up for cutting either hand of worm gears. In other words, if the machine is set up for cutting right-hand worm gears, work rotation movement is counterclockwise (Fig. 4), and the tangential feed of the hob is in the direction of the arrow *tr*. If the machine is initially set up for cutting left-hand worm gears, rotational movements of the work blank is clockwise and the direction of tangential feed of the cutter is in the direction of the arrow *tl*.

During tangential feeding, correlation in the relative rates of cutter rotation and work rotation is obtained through the differential mechanism above mentioned which operates to control differentially the relative rate of work index in accordance with the rate of tangential feed. Starting at the clutch gear 89 of the tanfeed train, power is directed through gears 99, 100, shaft 101, lead change gears and reversing means 102, shaft 103 to worm and worm wheel 104 connected with the differential housing 56. Thus whenever the tangential feed train is effective, compensation is automatically made for the lateral shifting of the hob. The direction of compensation, i. e., whether additive or subtractive, is determined by the direction of rotation of the differential housing 56, and this is controlled by inserting or removing a reversing gear 102ª in the lead gear mechanism 102. The gearing is arranged so that the gear 102ª will be used whenever gear 61ª is used in the index train. When the machine is used for infeed hobbing only, the differential shaft 103 may be locked against angular movement by removing its drive gear and placing thereon a locking plate 102ᵇ.

In the instant machine hand operated shifters are provided for the several clutches, reversers, and sliding gears therein as follows: Each of the serially arranged feed change mechanisms 66, 67, 68 are selectively shifted by means of levers 66ª, 67ª and 68ª.

The main feed clutch 74 is shiftable from its engaged to its disengaged position by a shifter 74ª operated from a rod 74ᵇ that is geared to the shaft 74ᶜ extending along the side of the machine and on which is splined a feed and traverse control lever 120. The control shaft 74ᶜ extends through a bracket 32ª mounted to the side of the stanchion and the lever 120 is splined to the shaft and moves with the bracket.

The dual clutch 75 is similarly shifted to one of its three positions by shifter 75ª that is actuated by the rod 75ᵇ. The latter is geared to a control shaft 75ᶜ that also extends along the side of the machine and through the bracket 32ª. An infeed and tangential feed control lever 140 is splined to the control shaft 75ᶜ and is operable to shift the clutch 75 from neutral to either of its effective positions. Spring detent means indicated at 75ᵈ is provided to assist in holding the clutch in set position.

The transmission of this machine also includes a selectively operable rapid traverse motor 105 for propelling the cutter in or out, and to the right or left at a relatively rapid rate. This motor is of the reversible type and is connected to drive the intermediate feed shaft 73', through the belt or chain drives 106 and 107, to back travel the cutter at the completion of its feed cycle and to advance or retract the cutter quickly during setting up operations.

Conflicting operations of the traverse motor 105 and the main drive and feed motor 40 must be avoided and therefore the controls for the motors are mechanically and electrically interlocked, as will be explained, and inconsistent operations prevented. Furthermore, the direction of motion of the reversible motor must be definitely coordinated with the functioning of the relation restoring mechanism 80—84 in the infeed train, i. e., as the direction of rotation of the feed shaft 73' changes with the hand of the gear to be cut, the gear 82 in the infeed branch train may be shifted "in" to effect an infeed under the one condition, and "out" to effect an infeed under the other condition, and consequently the traverse motor must run forwardly to back travel the cutter in the one instance, and run reversely to back travel the cutter in the other. Such a situation is confusing and means have been provided for automatically correlating the motor controls so as to obtain motor operation in such a direction as will be consistent with the legends "In" and "Out" on the control buttons irrespective of the previously set positions of reversers or motion direction restorers in series therewith. In the instant embodiment of this invention, the need for naturalizing directions of two drive trains applies to the infeed transmission, whereas, as to the tanfeed transmission the motion is not capable of being changed independently of the motor. However, the motor operations and resulting movement imparted to the cutter must be compatible with the legends "Left" and "Right" on the control buttons at all times. In the instant organization, therefore, one motor is utilized selectively to drive two transmissions; as to the one transmission the motor must automatically adapt itself to a changeable condition therein, but as to the other transmission, the motor operations must be consistent throughout; and as to both transmissions the motor must be capable of being reversed without upsetting previously set relations.

The manner in which the several trains of mechanisms and motors are automatically harmoniously related and interlocked will be explained with reference more particularly to Figs. 1, 2, and 3, the latter two figures illustrating the wiring and schematic wiring diagrams, respectively.

Referring to Fig. 2, the box MS represents a magnetic starter for the main drive motor 40, and the box RMS represents a reversing magnetic starter for the rapid traverse motor 105. Each of the starters is of standard commercial construction and need not be explained in detail except to state that the motor control main switches $a$, $b$, and $c$ thereof, are controlled and operated by electric solenoids 1ª, 3ª and 3ᵇ. Normally, the motor switches are open and no current passes to the respective motors. When, however, one of the solenoids 1ª, 3ª, 3ᵇ is energized the associated main switch is closed and the motor operation starts.

Each of the solenoids is controlled by a secondary circuit connected across power lines $L^1$ and $L^2$ as illustrated diagrammatically in Fig. 3. Assuming all of the serially arranged switches in the control circuit for solenoid 1ª are closed, as shown in the diagram, the pressing of the Start button will energize the solenoid 1ª, close the main switch $a$, and start the motor 40 operating. Connected in parallel with the motor 40 is a coolant motor 110 which may be operated whenever the main motor is operating, provided also its own starting switch SW is thrown to close the circuit.

When the Start button for the main motor is pressed a holding circuit, marked 1 and 2 through contact $a$ on the diagrams, is completed around the start button and the latter may be released. In series ahead of the starting switch is an Inch switch and a Stop switch, both normally closed. A pressing of the Inch switch will, if the main motor has been started, first deenergize the coil 1ª and open the holding circuit thereby stopping the motor, and continued pressing of the Inch switch will close a circuit across lines 1 and 2ª thereby energizing coil 1ª of the starting panel MS and restart the motor. The starting of the motor by the Inch button does not, however, complete any holding circuit across the coil 1ª and the main motor operates so long as the Inch button is pressed. Ahead of the Inch switch, the Stop switch is placed, and which, when pressed, will open any circuit that may have been completed to coil 1ª and thereupon effect stopping of the main motor.

In series ahead of the Stop switch are four additional normally closed switches, which will later be referred to, and ahead of those, are three normally closed microswitches, In, TFR, and TFL which are utilized to stop the infeed movement of the cutter at a precise point, the tangential feed right of the cutter, and the tangential feed left of the cutter at manually settable points.

The microswitch In is carried by the stanchion 32 and is adapted to be actuated by an adjustable precision abutment 111 mounted upon the dual clutch control rod 75c. The abutment 111 is carried by a short lever 112 that maintains a fixed angular relation with respect to the shaft 75c so that a rocking of the shaft 75c for the purpose of actuating the dual clutch 75, will also position the abutment 111 in or out of operative relation with respect to the operating button of the switch In. Fig. 5 illustrates in full lines the relative positions of the parts when the dual clutch is in neutral. When, however, the lever 140 is moved to its extreme downward position, the dual clutch 75 is shifted to the right, in Fig. 4, and power infeeding of the stanchion will occur. Concurrently, the abutment 111 is rocked into the path of movement of the switch In, and when the stanchion has been power fed to the point where the abutment is engaged by the switch In, the control circuit for the main motor is opened, whereupon the motor stops and power infeed stops.

Should the tangential feed train be in operation, the limit switches TFR and TFL are arranged and preset to open the circuit to the main motor when the cutter reaches the set limit of travel either to the right or to the left. The microswitches TFR and TFL are mounted in the pivotal head 35 of the machine, one at either side of a short actuating lever 113. Lever 113 projects through the front face of the head and has secured thereto a horizontally extending rod 114 that passes through and some distance beyond each end of the cross slide 37. At each side of the slide 37 adjustable dogs 115 are mounted upon the rod, each of which may be hand set to be engaged by the cross slide 37 when the latter has been power fed tangentially the required distance. When the cutter slide has reached one of the abutments 115 continued movement thereof actuates the rod 114 and its associated lever 113 and opens one of the switches TFR or TFL depending upon whether the direction of power feed is to the right or to the left, respectively.

The operator, having previously set the actuating dogs in their proper positions to stop the cutter feed "in" or to stop the cutter feed to the right or to the left at the proper points, may then press the Start button for the main motor and the machine will start operating and perform the tooling cycle and stop automatically at the end thereof. Or he may Inch the cutter to cutting position and then start the normal operation. At any time during the operating cycle he may stop the machine by pressing the Stop button.

Interlocked with the control for the main motor 40 is the control for the auxiliary rapid traverse motor 105. The interlocking of these controls takes the form of a normally closed switch RT which is mechanically connected for operation by the main feed control lever 120. When the feed control lever 120 is in its power feed position (full line position illustrated in Fig. 5) the power feed clutch 74 is shifted to the right (Fig. 4) and a short extension 120a on the control lever 120 engages and depresses the button of the switch RT and opens the entire control circuits for the forward and reverse coils of the reversing starter RMS. Accordingly, when the main power feed clutch is engaged, the rapid traverse motor is inoperative, and it is only when the power feed clutch is disengaged (lever 120 in dotted line position in Fig. 5) that the switch RT is closed thereby making it possible to operate the rapid traverse motor, provided other conditions are met.

As illustrated in Fig. 3, two sets of parallel circuits are provided for controlling the operation of coils 3a and 3b of the reversing panel RMS. One set is arranged to control direction of motor operation when used for the purpose of effecting power traverse of the cutter to the right or to the left, and the other set controls motor operation when used for effecting power traverse of the cutter in or out. Each of these four control circuits includes a normally open push button switch marked "Right," "Left," "In" and "Out," respectively, and to avoid confusion in their manipulation the four circuits are arranged in pairs and each pair connected to opposite sides of a double throw switch marked TI. Switch TI is in series with the rapid transverse switch RT and is also mechanically connected with the dual clutch control lever 140. When the dual control lever 140 is rocked downward, to thereby engage the clutch 75 with the infeed transmission 79 etc., the switch TI closes one pair of its contacts and completes an electrical connection to the pair of traverse motor control circuits including the "In" and "Out" push buttons, and the pair of circuits including the right and left push buttons is rendered ineffective. When, however, the control lever 140 is shifted to its uppermost position, to engage the tanfeed transmissions 77 with the feed shaft 73', the switch TI is actuated by an extension 140a on the lever to a position closing its other pair of contacts and completes a portion of the circuit including the "Right" and "Left" push buttons, and the pair of circuits that include the "In" and "Out" buttons become ineffective.

In series with each of the manual switches "Right," "Left," "In" and "Out" for the traverse motor, is a normally closed limit switch LSR, LSL, LSI, LSO, respectively. The limit switches LSR and LSL are located in the swivel head 35 of the machine adjacent the microswitches previously explained and are adapted to be actuated by the same lever 113 concurrently with the microswitches TFL and TFR. Two sets of switches in this particular location are necessary as each set controls a different motor and each motor must be stopped when the tool slide has been propelled to the right or to the left the set distance.

The limit switches LSI and LSO are mounted upon the base of the machine in the positions to be actuated by dogs carried by the movable stanchion 32 when the stanchion has reached the limit of its travel in or out.

In the control for the main feed motor, the micro limit switches are in series which automatically compels a back traverse of the cutter at the completion of the feed before the feed can again be started forward, and back traverse can be effected only if the main feed clutch is disengaged, whereas, the tangential limit switches for the traverse motor are in parallel, so that the cutter can be traversed back and forth by the one motor as often as desired. Ordinarily, however, the cutter slide is traversed to the right or to the left prior to any actual tooling operation performed by the cutter on the work or after the completion of the tooling operation and traversing of the cutter back and forth when it is out of engagement or out of contact with the work will not, of course, injure the workpiece.

It has been explained above that when the rapid traverse motor 105 is used for traversing the cutter stanchion "in" or "out" the direction of operation of the motor must concord with the previously set position of the sliding gear 82 in the infeed sub-transmission, and the position of the gear 82 depends upon whether the machine is set up for cutting left- or right-hand gears. The present invention aims to simplify the control in a manner whereby one set of push buttons marked "In" and "Out" may be used to effect stanchion traverse in the directions indicated by the legends on the buttons, when the machine is set up for cutting either right- or left-handed gears. To achieve that end a pair of mechanically connected reversing switches SR are connected in the "In" and "Out" control circuit of the motor 105 between the coils 3ª and 3ᵇ and the limit switches LSI and LSO. When the converting switch SR is in the position indicated in Fig. 3, a pressing of the "In" button will energize the forward coil 3ª of the reversing panel and the motor will run in a forward direction, whereas, a pressing of the "Out" button will energize the reverse coil 3ᵇ and the motor will run in the opposite direction. However, when the switch SR is shifted to its other position, the "In" button controls the reversing coil 3ᵇ and the "Out" button controls the forwarding coil 3ª.

The switch SR is located in the machine in a position to be operated automatically when the sliding gear 82 is shifted from one effective position to another. As shown on Figs. 1 and 4, a short lever 82ᶜ projects laterally from the gear shifting rod 82ᵇ to a position intermediate the opposed buttons of the reversing switches SR. When the rod 82ᵇ is shifted to restore a previously existing directional motion in the feed shaft 85, the switch SR is also actuated to close the switches on one side and complete portions of the controlling circuit to the coils 3ª and 3ᵇ, and when the control rod is shifted to its other extreme position the switches are also closed on the other side and thereby complete portion of the circuit to the coils 3ª and 3ᵇ but in the reverse manner. By interlocking and relating directional rotations of the traverse motor with the position of the sliding gear 82 in the infeed transmission, one set of control buttons may be employed with the assurance that the direction of cutter traverse will be consistent with the legend on the button actuated when the machine is set up for either right- or left-hand gear cutting. It will be further observed on inspection of Fig. 3, that the reversing switch SR is inserted in the control circuit for the in and out motions of the stanchion, and its function is confined solely to that branch of the control. Such a device for reversing directional relations is not required in the control circuit for the right and left traverse motions for the reason that directions of movement are predetermined by the fixed gearing between the rapid traverse motor 105 and the tangential feed screw 97.

When the traverse motor 105 is being operated to propel the cutter "in" or "out" or to the "right" or to the "left," the main motor 40 must not, of course, be allowed to operate because a starting of the main motor 40 would cause work and cutter rotations to occur thus bringing about a dangerous condition. Moreover, and dependent upon whether the rapid traverse motor 105 is being used at the time for traversing the cutter to the left or to the right, and in that event also driving the differential mechanism 56 through the branch drive 101, the starting of the main motor 40 would also drive the differential and bring about a chaotic condition. Therefore, to guard against an inadvertent operation of the main motor while using the traversing motor, each of the push button switches Right, Left, In and Out (marked R, L, I, and O in Fig. 3) are double circuit switches. Each of the switches has one set of contacts normally closed and connected in series with each of the others and forms part of the control circuit for the main motor. Fig. 3 illustrates diagrammatically the series connection of the traverse motor control switches with the control circuit of the coil 1ª of the main starting panel MS for the main motor. The dotted lines in Fig. 3 represent the mechanical connection between the respective push buttons (R, L, I, O,) and their respective series connected switches they operate. When, for example, the Right button is pressed to traverse the cutter to the right, an interconnected switch in the control circuit of the main motor is opened. Accordingly, if the main motor is running at the time, a pressing of the Right button of the traverse motor at once stops the main drive. On the other hand if the Right button is being actuated and the traverse motor is operating, the control circuit for the main motor cannot be completed and the motor cannot be started. The same interlocking relation between the control circuit of the main motor and the control circuits for the reversing motor is provided with respect to all of the control buttons Right, Left, In or Out and, in respect to the main motor 40, all of the control buttons for the traversing motor 105 are stop switches.

Fig. 2 of the drawings illustrates one method of wiring the machine wherein the various connections leading to and from the several switches and control panels are brought into a cable 116. Inasmuch as all of the control buttons for both motors are located upon the movable cutter stanchion 32, as illustrated in Fig. 1, the cable 116 is provided with a flexible portion 116ª between the stanchion mounted elements and the base mounted elements to provide for the moving of the stanchion. A similar flexible portion 117ª is provided in the cable 116 between the stanchion mounted elements and the switches in the relatively movable head 35. Thus the head and the stanchion may move relatively to each other and to the stationary base of the machine and the electrical connections remain intact. The numerals 1 to 21 in Fig. 2 indicate similar connecting lines of the control circuits that lead in or out of the cable 116 and correspond in numbering to the system used in Fig. 3 for the purpose of clarifying the circuits and their interconnections.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements or equivalents thereof, by Letters Patent of the United States:

1. A control system for correlating the operation and direction of operation of a plurality of motors operatively connectible to propel a member combining a first motor and a reversible second motor, a controller for the first motor including a start switch and a plurality of normally closed stop switches, a reversing controller for said reversible motor, a forward control switch for said controller, a reverse control switch for said controller, said start and said control switches each being electively operable to effect associated motor operation; and means interlocking each of the said control switches for the reversing motor with one of the normally closed stop switches for the said first motor so that said first motor may be operated exclusively or so that said reversible motor may be operated in either direction exclusively to propel said member.

2. A control means for a reversible motor comprising a reversing controller, a dual control circuit for the controller including two parallel connected sets of forward and reverse switches, and means common to both of said parallel connected sets of control switches for rendering but one of said sets of forward and reverse switches effective to control forward and reverse motor operation at any one time.

3. The combination set forth in claim 2 including means in the circuits of one of said sets of forward and reverse switches for oppositely converting their normal effect upon the actuation of said controller to thereby effect motor operation in directions opposite from normal.

4. A control system for controlling the operation of at least two electric motors operatively connectible to propel a member, one of said motors being reversible, combining separate control means for each of said motors each adapted when actuated to effect operation of each of said motors in a direction corresponding to the direction normally effected on actuation of the respective separate control means, means interlocking said control means whereby either one of said motors may be caused to be operated to the exclusion of the other, and means in the control means for the reversible motor operable at will to effect motor operation in a direction opposite to that normally effected on actuation of its separate control means.

5. A system of control for a reversible motor comprising, a forward and reverse controller for the motor for controlling its direction of operation, manually operable means normally effective when operated to actuate said controller and effect forward operation of said motor, manually operable means normally effective when actuated to actuate said controller and effect reverse operation of said motor, and additional means for reversing the effective action of said two manually operable means on said controller whereby to cause motor operations directionally opposite to said normal directions of operation respectively when said means is actuated.

6. A system of control for a reversible motor comprising, a manually operated normally forward motor switch, a manually operated normally reverse motor switch, means responsive to the actuation of said manual switches to effect motor operations normally in correspondence, and electively operable means interposed between said two manual switches and said responsive means for converting the responsive action of the latter thereby to effect reverse motor operation when said normally forward switch is actuated, and forward motor operation when said normally reverse switch is actuated.

GRANGER DAVENPORT.